United States Patent
Yoshida

(10) Patent No.: US 7,459,519 B2
(45) Date of Patent: Dec. 2, 2008

(54) METHOD FOR MANUFACTURING ELECTRICALLY CONDUCTIVE MACROMOLECULES AND SOLID STATE ELECTROLYTIC CAPACITOR USING ELECTRICALLY CONDUCTIVE MACROMOLECULES

(75) Inventor: Tsunenori Yoshida, Yawata (JP)

(73) Assignee: Panasonic Corporation, Osaka (JP)

( * ) Notice: Subject to any disclaimer, the term of this patent is extended or adjusted under 35 U.S.C. 154(b) by 580 days.

(21) Appl. No.: 10/541,484

(22) PCT Filed: May 17, 2004

(86) PCT No.: PCT/JP2004/006994

§ 371 (c)(1),
(2), (4) Date: Jul. 6, 2005

(87) PCT Pub. No.: WO2004/104071

PCT Pub. Date: Dec. 2, 2004

(65) Prior Publication Data

US 2006/0084768 A1    Apr. 20, 2006

(30) Foreign Application Priority Data

May 22, 2003    (JP) .............................. 2003-145347

(51) Int. Cl.
*C08F 2/36* (2006.01)
*C08G 61/00* (2006.01)
*C08G 61/12* (2006.01)
*C08G 85/00* (2006.01)

(52) U.S. Cl. ........................ 528/482; 528/483; 528/486; 528/501; 528/502 C; 528/503; 526/62; 526/72

(58) Field of Classification Search ................. 528/482, 528/483, 486, 501, 502 C, 503; 526/62, 526/72
See application file for complete search history.

(56) References Cited

U.S. PATENT DOCUMENTS 6,665,171 B1    12/2003    Takamuka et al.

FOREIGN PATENT DOCUMENTS

| EP | 0 696 037 A2 | 2/1996 |
|---|---|---|
| JP | 63-20361 | 1/1988 |
| JP | 63-256617 | 10/1988 |
| JP | 8-45790 | 2/1996 |
| JP | 10-53650 | 2/1998 |
| JP | 10-64761 | 3/1998 |
| JP | 2000-232036 | 8/2000 |
| JP | 2000-256574 | 9/2000 |
| JP | 2001-155975 | 6/2001 |
| JP | 2001-296700 | 10/2001 |

*Primary Examiner*—Duc Truong
(74) *Attorney, Agent, or Firm*—Hamre, Schumann, Mueller & Larson, P.C.

(57) ABSTRACT

The method for manufacturing electrically conductive macromolecules of the present invention is provided by reacting at least a monomer and an oxidizing agent to obtain electrically conductive macromolecules by a chemical polymerization method, the method including reacting the monomer and the oxidizing agent at least in a polymerizing vessel that contains a steam atmosphere. With this method, it is possible to obtain flat, electrically conductive macromolecules (10). Thus, it is possible to provide a method and an apparatus for manufacturing electrically conductive macromolecules in which it is possible to combine both low ESR and high capacity in a solid state electrolytic capacitor, realize low losses, and have low current leakage.

11 Claims, 7 Drawing Sheets

METHOD FOR MANUFACTURING ELECTRICALLY CONDUCTIVE MACROMOLECULES AND SOLID STATE ELECTROLYTIC CAPACITOR USING ELECTRICALLY CONDUCTIVE MACROMOLECULES

TECHNICAL FIELD

The present invention relates to methods and apparatuses for manufacturing electrically conductive macromolecules that are useful in electronic components and solid state electrolytic capacitors, for example.

BACKGROUND ART

Electronic components, in particular solid state electrolytic capacitors in which electrically conductive macromolecules are used, are described as one example of the conventional art. In recent years, there has been a noticeable increase in the frequency and the current of integrated circuits of electronic devices in which solid state electrolytic capacitors are used. Accordingly, there is a demand for solid state electrolytic capacitors whose equivalent series resistance (abbreviated as "ESR") is low, that have a large capacity and that have small losses. The conventional method for manufacturing an internal electrode (that is to say, a capacitor element) of a solid state electrolytic capacitor is illustrated for solid state electrolytic capacitors. First of all, valve metal (for example tantalum metal) that is to be the anodic conductor is anodized in an electrolytic solution such as phosphoric acid to form an oxide film layer (dielectric layer) on the surface. Next, a solid state electrolyte is formed on the surface of the oxide film layer. Manganese dioxide, which can be formed by, for example, immersing the anodic conductor in a manganese nitrate solution, withdrawing, and then firing, is known as a solid state electrolyte. Finally, a cathodic conductor is formed on the solid state electrolyte. A laminated body of, for example, a carbon layer and a silver-surface conductive resin layer can be used for the cathodic conductor. In order for the capacitor element to connect electrically with the exterior, an anodic lead terminal and a cathodic lead terminal respectively are connected to the anodic conductor and the cathodic conductor.

Although the above-noted members individually may influence the ESR by their own resistance, the solid state electrolyte is the material that should be given the most consideration with respect to resistance. In order to reduce the resistance of the solid state electrolyte, it has been proposed that an electrically conductive macromolecular material whose conductivity is higher than that of manganese dioxide (which has a conductivity of about 0.1 S/cm), and this has come into regular use. For example, if polypyrrole is used, then it is possible to realize a conductivity of about 100 S/cm. In addition to pyrrole, compounds such as aniline, thiophene and 3,4-ethylenedioxythiophene are known as monomers for constituting electrically conductive macromolecular material. Methods for forming electrically conductive macromolecular layers are divided broadly into chemical oxidation polymerization and electrolytic oxidation polymerization.

Contact resistance between layers also affects ESR. In Patent Reference 1, below, which is by the applicant of the present application, it has been disclosed that by mixing electrically conductive polymer micro-particles into the electrically conductive macromolecular layer, contact resistance between the electrically conductive macromolecular layer and the cathodic conductor is reduced by the surface roughness that is formed by the micro-particles. In the method described in this publication, the electrically conductive macromolecular layer is formed by a chemical oxidation polymerization method in which a polymerization solution that is a dispersion of the electrically conductive polymer micro-particles is used.

In order to greatly increase the capacitance of capacitors, it also has been proposed to form the electrically conductive macromolecular layer in particle form. In Patent Reference 2 below, it has been disclosed that particulate polypyrrole having a particle diameter of 0.2 μm or less is formed by chemical oxidation using a polymerization solution in which the molar ratio of the mixture of oxidizing agent to monomer is at least 1. If the particle diameter of the electrically conductive macromolecular layer is reduced, then delamination of the layer can be suppressed and it is easier to gain use of dormant capacitance contained within the dielectric layer.

In Patent Reference 3 below, a method for manufacturing a solid state electrolytic capacitor is disclosed, the method including a process for forming an electrically conductive polymer layer on a synthetic film by immersing a capacitor element in a solution that includes a monomer, which becomes the electrically conductive polymer by oxidation polymerization, and an oxidizing agent, after which the capacitor element is left to stand in air at a temperature of about 30° C. to 50° C. and a relative humidity of at least about 60%. This is with the object of clarifying preferable conditions for forming an electrically conductive polymer layer by chemical polymerization on a capacitor element that includes an anodic member on which a synthetic film is formed, and providing a solid state electrolytic capacitor that is compact, that has a large capacity, that has a low ESR and that has superior productivity.

Patent Reference 1: JP 2000-232036A
Patent Reference 2: JP H8-45790A
Patent Reference 3: JP H10-64761A As given above, numerous investigations have been carried out with regard to solid state electrolytic capacitors in which electrically conductive macromolecular layers are used as solid state electrolytes. However, compatibility between low ESR and high capacity in solid state electrolytic capacitors, and also realization of low losses and reduction of leakage current have not yet been sufficiently achieved.

DISCLOSURE OF INVENTION

In order to solve the above problem, the present invention provides a method and an apparatus for manufacturing electrically conductive macromolecules in which it is possible to combine both low ESR and high capacitance in the solid state electrolytic capacitor, and also realize low losses and low current leakage, and to provide a method for manufacturing electronic components and solid state electrolytic capacitors in which the electrically conductive macromolecules are used.

The method for manufacturing electrically conductive macromolecules of the present invention is a method for manufacturing electrically conductive macromolecules by reacting at least a monomer and an oxidizing agent to obtain electrically conductive macromolecules by a chemical polymerization method, the method comprising; reacting the monomer and the oxidizing agent in a polymerizing vessel that contains at least a steam (water vapor) atmosphere.

The apparatus for manufacturing the electrically conductive molecules of the present invention is an apparatus for manufacturing electrically conductive macromolecules, for polymerizing at least a monomer and an oxidizing agent in a polymerizing vessel, wherein the polymerizing vessel that contains steam atmosphere includes a device for providing dry air and steam that is generated by a heat exchanger to the polymerizing vessel, at least in the polymerizing vessel, and wherein the reaction of the monomer and the oxidizing agent at least occurs within the polymerizing vessel in the steam atmosphere.

BEST MODE CARRYING OUT THE INVENTION

Figure 1A:
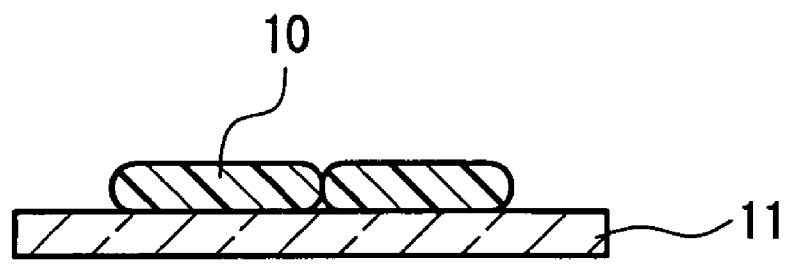
FIG. 1A is a cross-sectional view showing an example of an electrically conductive macromolecular film that is formed on a glass substrate in Working Example 1 of the present invention and FIG. 1B is a cross-sectional view showing an electrically conductive macromolecular film of a comparative example.

The present invention includes reacting at least a monomer and an oxidizing agent to obtain electrically conductive macromolecules by a chemical polymerization method, wherein the monomer and the oxidizing agent are reacted at least in a polymerizing vessel that contains a steam atmosphere. Furthermore, it is desirable that the steam concentration of the steam atmosphere is at least 5 vol %. This is in order both to reduce the vaporization speed of the solvent, and to increase the temperature of the polymerized body. If the steam concentration is less than 5 vol %, then it tends to be difficult to achieve both.

It is desirable that the temperature of the steam atmosphere is at least 85° C. The polymerization reaction rate increases with increased temperature, and thus it is possible to increase the yield of the polymer film, and decrease the time for the polymerization reaction.

Before reacting the monomer and the oxidizing agent in a polymerizing tank having a steam atmosphere, it is possible that preliminary polymerization is performed in advance at a temperature of less than 85° C. By preliminary polymerization, the polymerization solution seeps into fine aperture portions by capillary action, and reacts, and there is an advantage in that it is possible to fill the polymer film into the internal portions of the fine apertures.

Furthermore, it is desirable that the concentration of oxygen in the steam atmosphere is less than 21 vol %. In this way, it is possible to prevent oxidation degeneration of the previously formed polymer film when repeating the polymerization.

Furthermore, it is desirable that the monomer is at least one of pyrrole, thiophene, 3,4-ethylenedioxythiophene and aniline, and their derivatives, and that that the oxidizing agent is at least one of manganese oxide, iron (III) salts, copper (II) salts, hydrogen peroxide and persulfate salts, and that the monomer and the oxidizing agent are at least dissolved in a water soluble solvent or water. Thus, there is an increased affinity when the steam adheres to the polymerized body, and it is easier to obtain a polymer body that is film-shaped.

Furthermore, it is preferable that when observing the electrically conductive macromolecular layer obtained by the present invention from the side, a ratio d/L of a separation distance d of the electrically conductive macromolecular layer from a substrate, to a length L, is at least 0 and is 0.02 or less. In this way, it is possible to provide electrically conductive macromolecules in which delamination from the substrate is reduced because the warp of the electrically conductive macromolecular film is small, and it is flat.

Furthermore, an apparatus, including the polymerizing vessel that contains the steam atmosphere has at least a device for providing dry air and steam that is generated by a heat exchanger to the polymerizing vessel. Furthermore, it is desirable that the temperature of the steam generated by the heat exchanger is higher than the temperature of the dry air. This is so as to reduce variations in the steam concentration in the polymerizing vessel. In this case, if the temperature of the steam that is generated by the heat exchanger is higher than the temperature of the dry air, then the steam, which has the higher thermal capacity, contacts the polymerized body, and thus the temperature of the polymerized body can be increased rapidly.

Furthermore, the present invention provides electronic components, in particular solid state electrolytic capacitors employing electrically conductive macromolecules in which an electrically conductive macromolecular film that is flat is obtained by any method described above. Furthermore, the present invention provides electronic components, in particular solid state electrolytic capacitors employing an electrically conductive macromolecular film, wherein the density of the surface and the rear of the electrically conductive macromolecular film is substantially the same. Moreover, the present invention provides a method for manufacturing solid state electrolytic capacitors that includes a step of reacting a monomer and an oxidizing agent at 60° C. or less (with no restriction on steam, this may be in a dry atmosphere) and a step of polymerizing in a polymerizing vessel in a steam atmosphere of at least 85° C. in order that dosing of the electrically conductive macromolecules into the anodic conductor of the solid state electrolytic capacitor, which is a porous body containing numerous fine pores, is facilitated.

With the present invention, it is possible to provide a low resistance electrically conductive macromolecular film whose polymerization speed on the base material side and on the opposite, vapor phase side is substantially the same, whose density is substantially the same, and whose adhesion to the base material, in particular glass and ceramics, is favorable, and a method for manufacturing the same, by reacting at least a monomer and an oxidizing agent to obtain electrically conductive macromolecules by a chemical polymerization method, the method at least comprising reacting the monomer and the oxidizing agent in a polymerizing vessel that contains a steam atmosphere, and to provide electrically conductive macromolecules wherein delamination from the base material is small because warp of the electrically conductive macromolecular film is small, and the film is flat Furthermore, it is possible to reduce the oxygen concentration (oxygen partial pressure), and to reduce oxygen degradation of the electrically conductive macromolecules by using steam to provide low resistance electrically conductive macromolecules. Thus, it is possible to provide solid state electrolytic capacitors that suitably combine both low ESR and large capacity, and a method for manufacturing the same, and also to provide electronic components in which the electrically conductive macromolecules are used, and methods for manufacturing those components.

Preferable embodiments of the present invention are described below with reference to the drawings.

Figure 3:
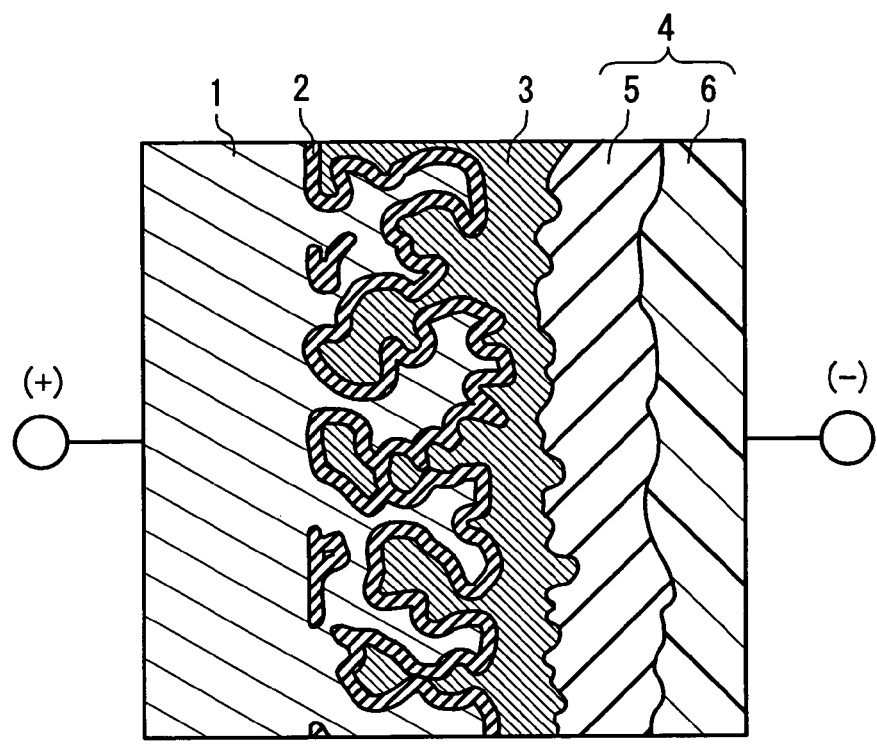
FIG. 3 is a view showing an example of a cross-section of an electrolytic capacitor according to the present invention.

As shown in FIG. 3, a capacitor element usually has a structure in which a dielectric layer 2, a solid state electrolyte 3 and a cathodic conductor 4 are laminated in that order onto an anodic conductor 1. The cathodic conductor 4 has a double layer structure made from a carbon layer 5 and a silver-surface electrically conductive resin layer 6. The anodic conductor 1 is formed from a sintered body, made from a plate, foil or wire of metal that has valve action, and micro-particles of a metal that has valve action, or from a metal foil that has been etched, for example, to increase its surface area. For the valve metal, it is possible to use at least one selected from the group consisting of tantalum, aluminium, titanium, niobium and zirconium, or alloys of these, and is preferably tantalum, aluminium and niobium. The capacitor may also use, for example, tantalum powder and niobium foil or wire.

The dielectric layer 2 is an oxide film of the surface of the anodic conductor 1 that has been electrolytically oxidized, and it is also formed within aperture portions of, for example, the sintered body or the etched foil. The thickness of the oxide layer film can be controlled by the voltage of the electrolytic oxidation.

The solid state electrolyte 3 includes at least an electrically conductive macromolecular layer. It is preferable that the electrically conductive macromolecular layer includes at least one polymer selected from, for example, polypyrrole, polythiophene, polyaniline and poly-3,4-ethylenedioxythiophene, and particularly pyrrole, thiophene and 3,4-ethylenedioxythiophene and their derivatives. The electrically conductive macromolecular layer can be formed by chemical oxidation polymerization using a monomer such as pyrrole, a dopant such as alkylnaphthalenesulfonic acid and an oxidizing agent such as manganese dioxide, iron (III) sulfate, copper (II) sulfate, sodium persulfate, ammonium persulfate and hydrogen peroxide solution. In addition to chemical oxidation polymerization, the solid state electrolyte may be formed by electrolytic oxidation polymerization, the detail of which is described below.

It should be noted that the solid state electrolyte 3 also may include oxide electrically conductive bodies such as ruthenium oxide, and organic semiconductors such as TCNQ complex (7,7,8,8-tetracyano quinodimethane complex salt).

The cathodic conductor 4 may be provided as a laminated body made from, for example, the carbon layer 5 and the silver-surface electrically conductive resin layer 6. The carbon layer 5 includes carbon particles as the electrically conductive particles, and the electrical connection between the silver powder included in the electrically conductive resin layer 6 and the solid state electrolyte layer 3 is closely maintained by these carbon particles.

Although omitted from FIG. 3, the capacitor element is a solid state electrolytic capacitor in which an anodic lead terminal and a cathodic lead terminal are respectively connected to the anodic conductor 1 and the cathodic conductor 4, and in which the lead terminals are sealed within an outer layer resin, which is, for example, an epoxy resin.

A description of electrolytic oxidation polymerization is given below with reference to FIG. 4.

Figure 4:
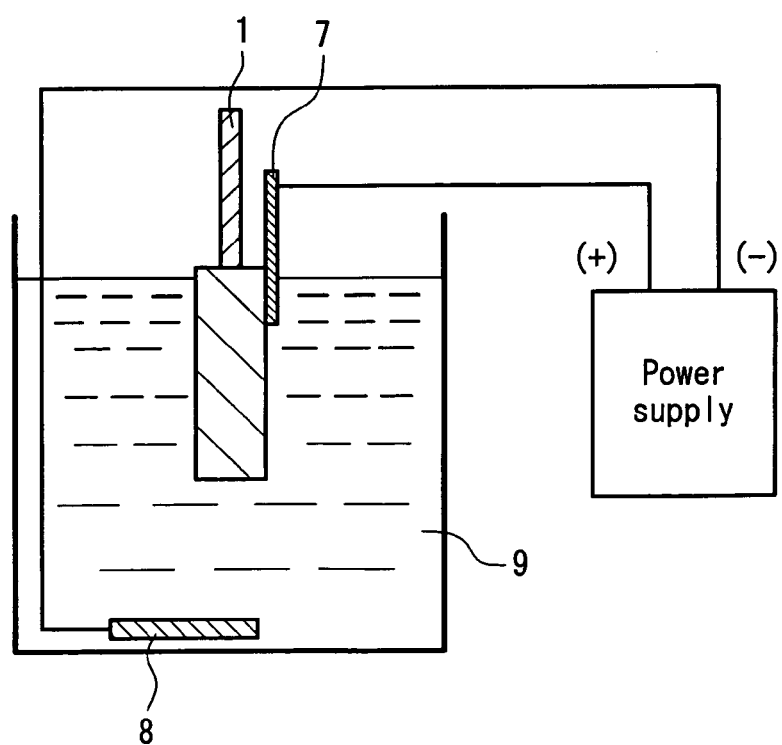
FIG. 4 is a view showing an example of the arrangement of polymerizing electrodes used in performing the method of the present invention.

FIG. 4 shows an example of an arrangement of various polymerizing electrodes used in electrolytic oxidation polymerization. As shown in these diagrams, electrolytic oxidation polymerization is performed by immersing a film forming substrate on which the film is to be formed (the anodic conductor 1 that has been conferred with conductivity in advance), a polymerization anode (anodic electrode) 7 and a polymerization cathode (cathodic electrode) 8 into a polymerizing solution 9. The anode 7 and the cathode 8 are connected to a power source 12. Usually, the anode 7 is fixed in the vicinity of the film forming substrate 1. In this case, as shown in FIG. 4, it is preferable that the anode 7 and the cathode 8 are arranged such that at least a part of the film forming substrate 1 is between the electrodes 7 and 8.

With the present invention, it is easy to achieve a solid state electrolytic capacitor that has both low ESR and large capacity, and also to realize low losses and low current leakage.

The present invention is described in further detail below using working examples.

WORKING EXAMPLE 1

Figure 1B:
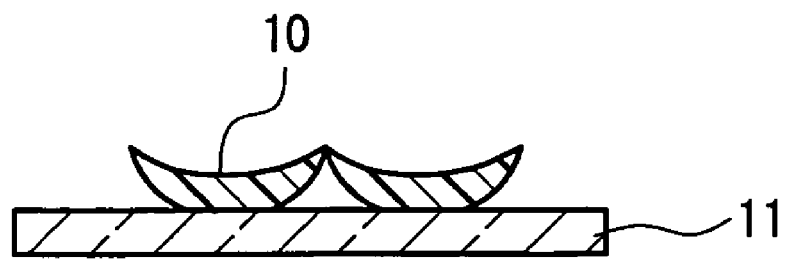

It has been confirmed that the attributes of an electrically conductive macromolecular film change with changes in steam concentration during chemical oxidation polymerization on a glass substrate. A cross-sectional schematic diagram of this situation is shown in FIG. 1.

Figure 2A:
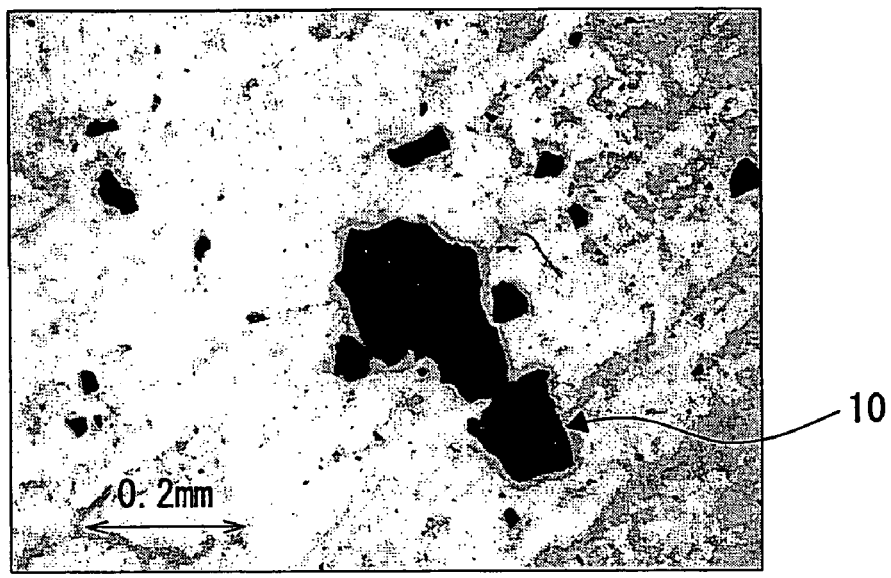
FIG. 2A is an example of a photo taken by an optical microscope, of the electrically conductive macromolecular film formed on the glass substrate in Working Example 1 of the present invention.
Figure 2B:
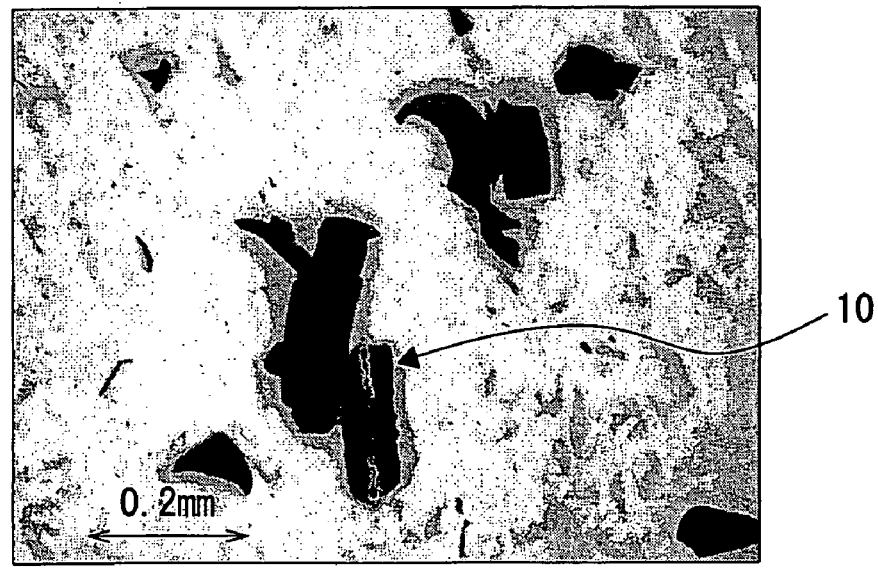
FIG. 2B is a photo taken by an optical microscope of the electrically conductive macromolecular film of the comparative example.

A glass substrate 11 was washed and dried, after which electrically conductive macromolecules 10 were formed. Poly-3,4-ethylenedioxythiophene was formed as the electrically conductive macromolecules. First, the polymerizing solution was formulated by mixing 2 g of 3,4-ethylenedioxythiophene, 44 g of an ethanol solution containing 40 wt % iron (III) alkylnaphthalenesulfonate and 20 g of water. This polymerizing solution was coated onto the glass substrate and dried for 5 min at room temperature, after which it was polymerized by heating at 150° C. for 20 min in atmospheres, the conditions of which were 70 vol % steam (shown in FIG. 1A) and a dry atmosphere of 0 vol % (shown in FIG. 1B). Continuing, after washing the electrically conductive, macromolecular film in ethanol, washing it in a 0.5% citric acid solution at 85° C. and washing it in a hot water shower at 90° C., the electrically conductive macromolecular film was forcibly separated from the glass substrate and dried at 105° C. for 10 min. Photographs of this taken with an optical microscope are shown in FIG. 2A and FIG. 2B. FIG. 2A shows the case of the 70 vol % steam and FIG. 2B shows the case of the dry atmosphere, that is to say, the case in which steam was 0 vol % (the case in which the humidity was below the detectible limit, as detected by a humidity sensor manufactured by Yokogawa Electric Corporation).

Figure 9:
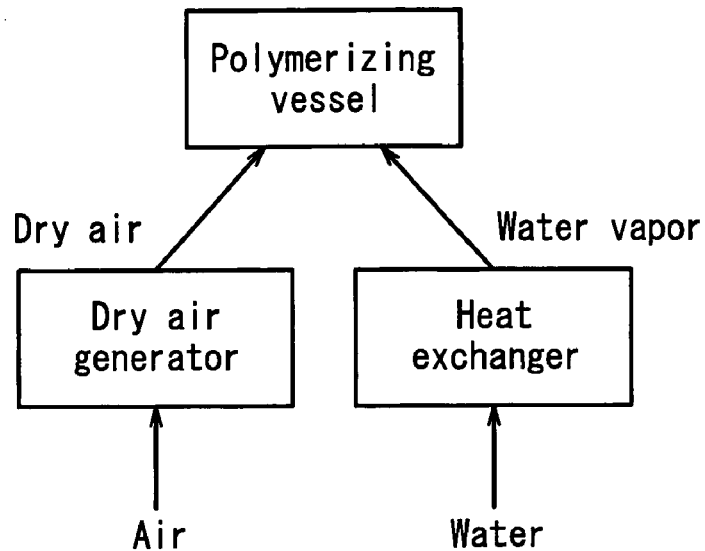
FIG. 9 is a diagram that schematically shows an example of an apparatus for manufacturing the electrically conductive macromolecules used in performing the method of the present invention.
Figure 10:
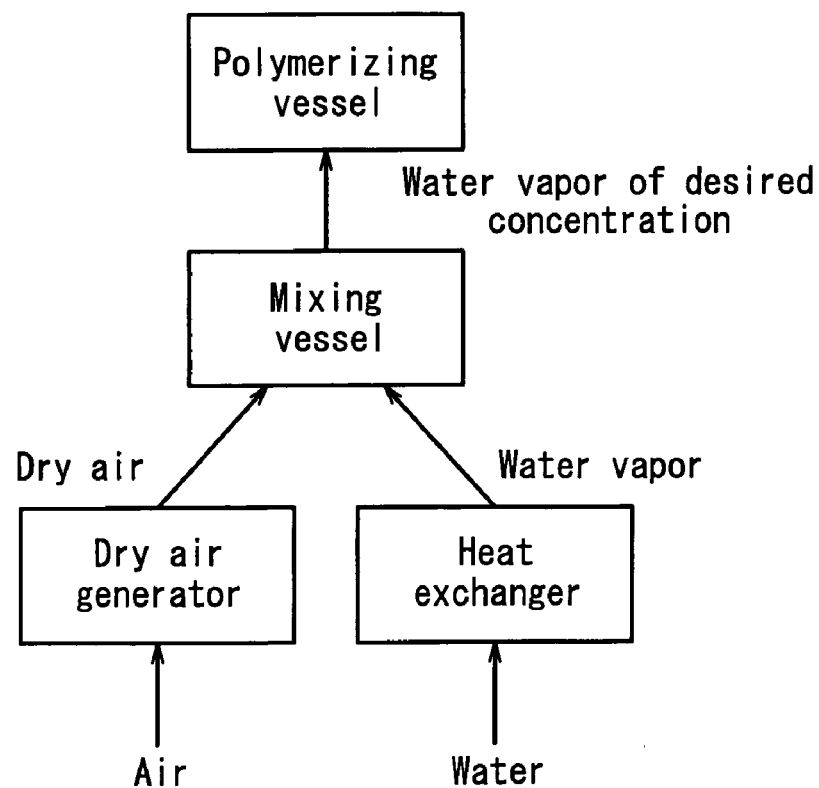
FIG. 10 is a diagram that schematically shows an example of an apparatus for manufacturing the electrically conductive macromolecules used in performing the method of the present invention.

Steam in the polymerizing vessel was obtained by introducing dry air and steam, which is water that has been vaporized by a heat exchanger, into the polymerizing vessel as schematically shown in FIG. 9. In this case, when the temperature of the steam that has been generated by the heat exchanger is higher than the temperature of the dry air, the steam, which has the higher thermal capacity, contacts the polymerized body, and thus it is possible to increase rapidly the temperature of the body that is polymerized. Moreover, the dry air and the steam may be mixed in advance and then introduced into the polymerizing vessel, as shown in FIG. 10. This is in order to reduce variability in the concentration of the steam in the polymerizing vessel. In this case, when the temperature of the steam that is generated by the heat exchanger is higher than that of the dry air, the steam, which has the higher thermal capacity, contacts the polymerized body, and thus it is possible to increase rapidly the temperature of the polymerized body.

As is made clear in FIG. 1 and FIG. 2, by performing polymerization in a steam atmosphere, because the speed of polymerization on the base material side of the glass substrate, which is the base material, is substantially the same as the speed of polymerization on the vapor phase side on the opposite surface, and the density is also substantially the same, and because adhesion of the molecules to the glass is favorable and the electrically conductive macromolecular film has little warping and is flat, it is possible to provide electrically conductive macromolecules that have little delamination from the base material, and it is possible to apply the electrically conductive macromolecules to use in electronic components.

WORKING EXAMPLE 2

An anodic conductor made of sintered pellets was fabricated by forming micro-powder made from tantalum metal having valve action whose specific surface area is 100000 μF·V/g, into dimensions of 0.3 mm ×3.0 mm×3.8 mm, and vacuum sintering in a form provided with tantalum wire leads for connecting the anode. Next, a tantalum oxide film was formed on the surface of the anodic conductor as a dielectric layer by synthesis under conditions of applying a voltage of 7.5 V to the anodic conductor while in a 5 wt % aqueous solution of phosphoric acid at 90° C.

Figures 5A, 5B, 5C:
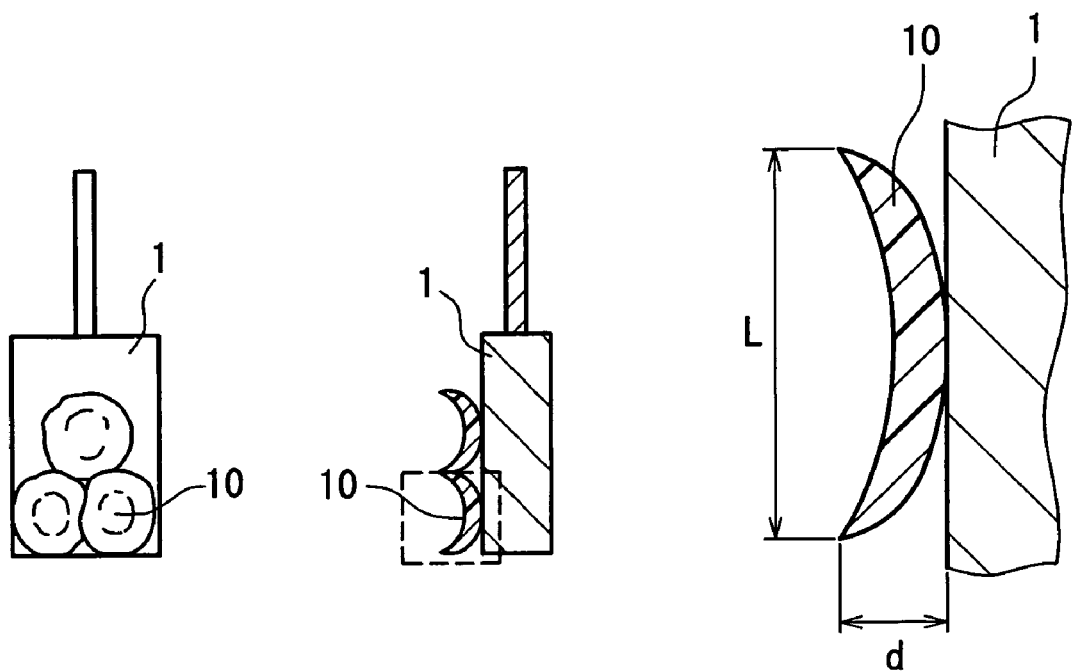
FIG. 5A is a plan view for explaining how the polymerized film that is polymerized in a dry atmosphere of the comparative example is attached.
FIG. 5B is a cross-sectional view of the same.
FIG. 5C is an explanatory diagram for showing a ratio d/L of a separation distance d from the cross-section of the anodic conductor of the first electrically conductive macromolecular layer, to a length L in the direction of the cross-section of the anodic conductor.
Figures 6A, 6B:
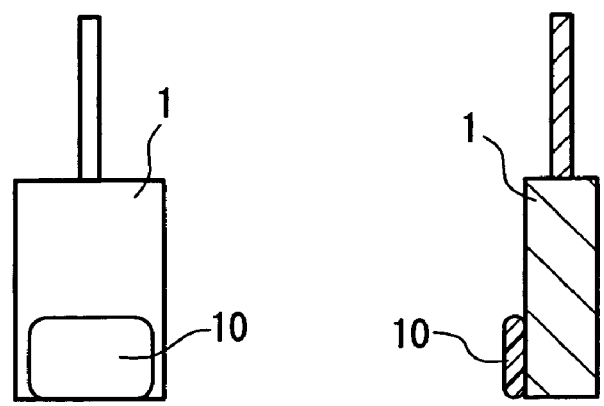
FIG. 6A is a plan view for explaining how the polymerized film that is polymerized in a steam atmosphere of Working Example 2 is attached.
FIG. 6B is a cross-sectional view of the same.

The anodic conductor was washed and dried, after which the solid state electrolyte was formed. Here, poly-3,4-ethylenedioxythiophene was formed as the electrically conductive macromolecules. First, chemical oxidation polymerization was performed in order to impart electrical conductivity to the dielectric layer. The polymerizing solution was formulated by mixing 1.8 g of 3,4-ethylenedioxythiophene, 44 g of an ethanol solution containing 40 wt % iron (III) alkylnaphthalenesulfonate and 30 g of water: The anodic conductor was immersed in the polymerizing solution and polymerized in air at 40° C. for 10 min, after which chemical oxidation polymerization was performed by repeating the polymerization operation six times in a combination of five conditions of steam concentrations of 70 vol %, 40 vol %, 10 vol %, 5 vol % arid 0 vol %, and four conditions of temperatures of 85° C., 105° C., 155° C. and 205° C. Continuing, the dielectric layer was resynthesised in a 0.1% concentration solution of acetic acid at a resynthesizing voltage of 7.5 V, and restored. Moreover, the anodic conductor was washed in pure water at about 90° C., and dried in air at about 120° C. FIGS. 5A-5C schematically show top and cross-sectional views of elements created in conditions of 155° C. and moisture ratio of 0 vol % (comparative example) and FIGS. 6A-6B schematically shows top and cross-sectional views of elements created in conditions of 155° C. and a moisture ratio of 70 vol %. No delamination was observed in the electrically conductive macromolecular film created in the conditions of 155° C. and steam of 70 vol %. In this way, an anodic conductor in which a dielectric layer and an electrically conductive macromolecular film are formed by chemical oxidation polymerization was obtained as a film fanning substrate for electrolytic oxidation polymerization.

The arrangement of the electrodes for electrolytic oxidation polymerization is as shown in FIG. 4. Nickel wire having a wire diameter of 200 μm was fixed in the vicinity of the film forming substrate as the anode, and was immersed with the cathode into the polymerizing solution. The polymerizing solution was formulated by mixing 100 g of 40 wt % aqueous sodium alkylnaphthalenesulfonate solution, 10 g of 3,4-ethylenedioxythiophene, 500 g of water and a predetermined amount of sulfuric acid. Here, the sulfuric acid was added such that the pH was a predetermined value of 7.

The electrolytic oxidation polymerization was performed at an applied voltage of 2.5 V. The time for polymerization was adjusted such that the thickness of the electrically conductive macromolecular layer, being the surface layer on the film forming substrate, was uniformly about 20 μm.

Continuing, the anodic conductor in which the electrically conductive macromolecular layer was formed was immersed in an aqueous suspension containing carbon micro particles, and was stood in 130° C. air for 30 minutes to dry and harden the suspension. In this way, a carbon layer was formed on the electrically conductive macromolecular layer. Moreover, the anodic conductor was allowed to stand immersed in a silver paint solution at room temperature for one hour, and was removed and stood in air at 145° C. for one hour to dry and harden the silver paint. In this way, a silver-surface electrically conducting resin layer was formed.

Furthermore, using silver conductive adhesive, a cathodic lead terminal was connected to the cathodic conductor, which is made of the carbon layer and the silver-surface electrically conductive resin layer, and the tantalum wire that extends from the anodic conductor was welded to the anodic lead terminal. Finally, the capacitor elements were externally covered with an epoxy resin to complete the solid state electrolytic capacitor.

Figure 7A:
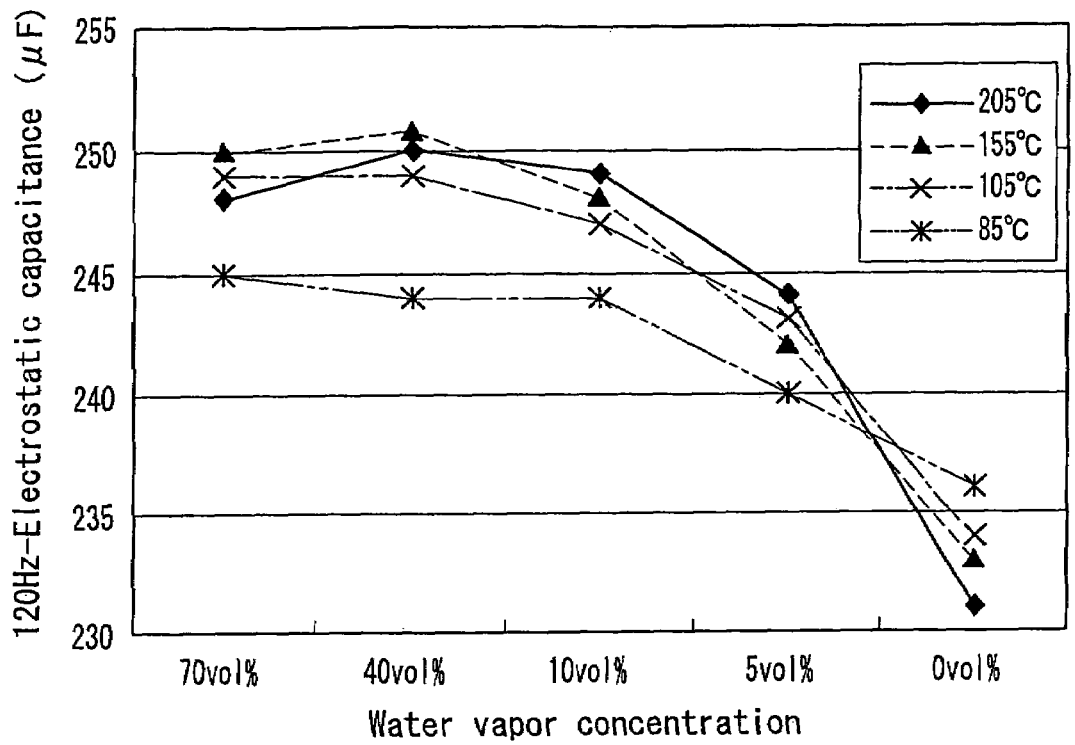
FIG. 7A is a graph showing the relationship of electrostatic capacitance at a frequency of 120 Hz, and the steam concentration and polymerization temperature in Working Example 2 of the present invention.
Figure 7B:
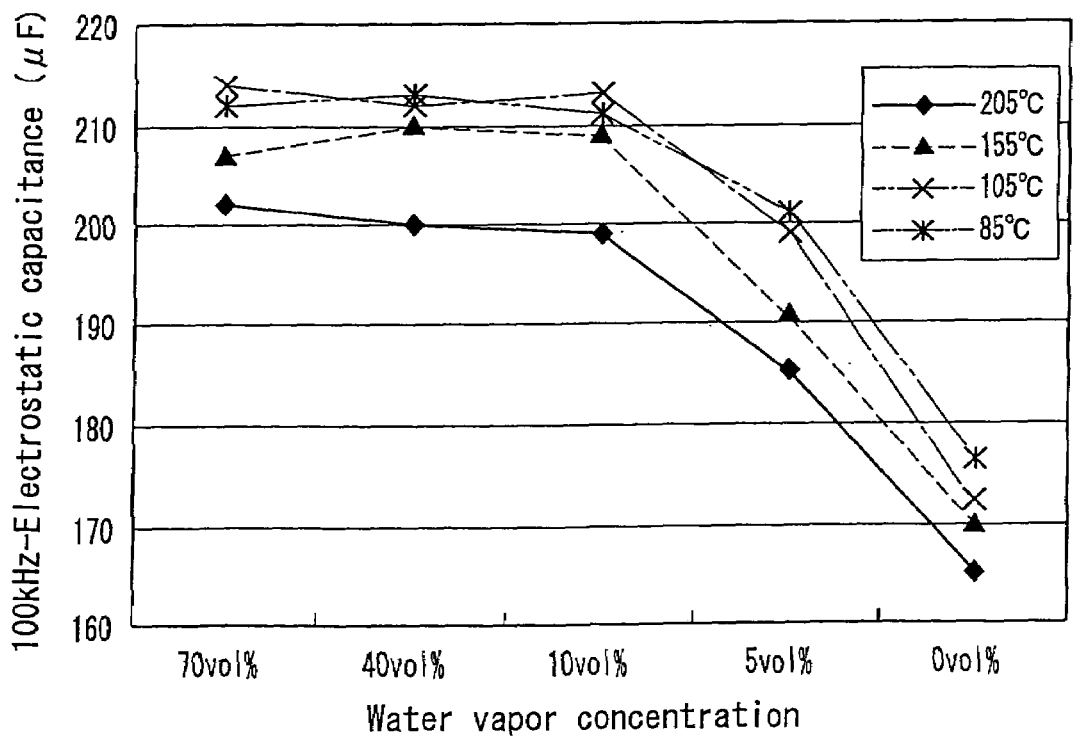
FIG. 7B is a graph showing the relationship of electrostatic capacitance at a frequency of 100 kHz, and the steam concentration and polymerization temperature in Working Example 2 of the present invention.
Figure 8A:
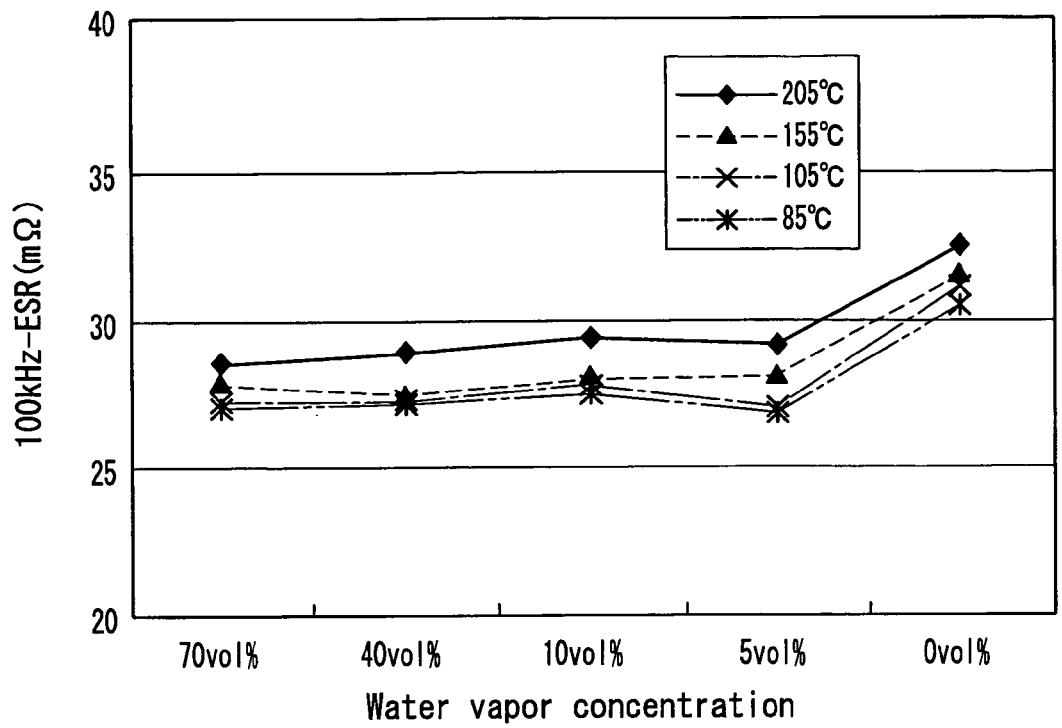
FIG. 8A is a graph of the ESR of Working Example 2 of the present invention when measured at a frequency of 100 kHz.
Figure 8B:
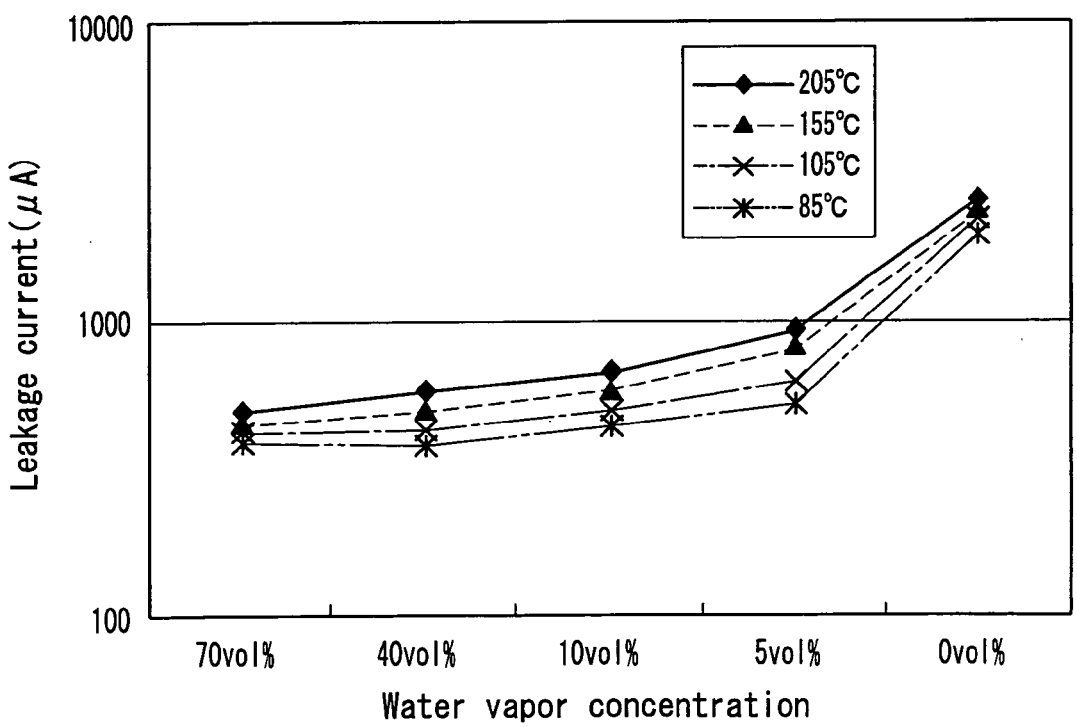
FIG. 8B is a graph of the leakage current 30 s after applying a voltage of 2.5 V to the solid state electrolytic capacitors of Working Example 2.

For the solid state capacitors obtained in this way, the static electricity capacity was measured at a frequency of 120 Hz and 100 kHz, and the ESR was measured at a frequency of 100 kHz. Moreover, a current recorded 30 seconds after a voltage of 2.5 V was applied to the solid state capacitors was taken as the leakage current. The results are shown in FIGS. 7A-7B, and FIGS. 8A-8B. FIGS. 7A-7B respectively show average values of 20 sample points.

As shown in FIGS. 7A-7B and FIGS. 8A-8B, it can be seen that large capacity, low ESR and low leak current electrolytic capacitors can be obtained by polymerization in a steam atmosphere. Furthermore, it was possible to reduce the oxygen concentration (oxygen partial pressure) and reduce the oxygen degradation of the electrically conductive macromolecules to obtain low resistance electrically conductive macromolecules, and to obtain electrically conductive macromolecules whose film delamination is small, so that solid state electrolytic capacitors that suitably combine both low ESR and large capacity were obtained.

Furthermore, cross-sections of the capacitor of the present invention, and of the comparative example, were exposed by grinding, after which the interface between a first electrically conductive macromolecular layer (chemical polymerization layer) and a second electrically conductive macromolecular layer (electrolytic oxidation polymerization layer) was exposed by ultrasonic irradiation while in a 1 mol/L aqueous solution of hypochloric acid. On inspection under a microscope, the ratio d/l of a separation distance d, of the cross-section of the first electrically conductive macromolecular layer 10 from the surface of the anodic conductor 1, to a length L of the cross-section in the direction of the anodic conductor (FIG. 5C) was substantially 0.02 or less in the present working example, and 0.03 or more in the comparative example.

WORKING EXAMPLE 3

An anodic conductor made of sintered pellets was fabricated by forming micro-powder made from tantalum metal having valve action whose specific surface area is 100000 μF·V/g, into dimensions of 0.3 mm×3.0 mm×3.8 mm, and vacuum sintering in a form provided with tantalum wire leads for connecting the anode. Next, a tantalum oxide film was formed on the surface of the anodic conductor as a dielectric layer by synthesis under conditions of applying a voltage of 7.5 V to the anodic conductor while in a 5 wt % aqueous solution of phosphoric acid at 90° C.

The anodic conductor was washed and dried, after which the solid state electrolyte was formed. Here, poly-3,4-ethylenedioxythiophene molecules were formed as the electrically conductive macromolecules. First, chemical oxidation polymerization was performed in order to impart electrical conductivity to the dielectric layer. The polymerizing solution was formulated by mixing 1.8 g of 3,4-ethylenedioxythiophene, 44 g of an ethanol solution containing 40 wt % iron (III) alkylnaphthalenesulfonate and 30 g of water. The solid state capacitors (sample 1 and sample 2) were fabricated by immersing the anodic conductors in this polymerizing solution and polymerizing in air at 60° C. for 10 min, after which they were polymerized at a temperature of 155° C. in two conditions: steam at a concentration of 70 vol % (fabrication condition of sample 1) or 0 vol % (fabrication condition of sample 2). Continuing, the anodic conductor was resynthesized in an approximately 0.1% concentration acetic acid solution at a resynthesizing voltage of 6 V, wherein chemical oxidation polymerization was performed by regenerating the dielectric layer 20 times.

Continuing, the anodic conductor on which the electrically conductive macromolecular layer was formed was immersed in an aqueous suspension containing carbon microparticles, and was stood in 130° C. air for 30 minutes to dry and harden the suspension. In this way, a carbon layer was formed on the electrically conductive macromolecular layer. Moreover, the anodic conductor was allowed to stand immersed in a silver paint solution at room temperature for one hour, and was removed and stood in air at 145° C. for one hour to dry and harden the silver paint. In this way, a silver-surface electrically conducting resin layer was formed.

Furthermore, using silver electrically conductive adhesive, a cathodic lead terminal was connected to the cathodic conductor, which is made of the carbon layer and the silver-surface electrically conductive resin layer, and the tantalum wire that extends from the anodic conductor was welded to the cathodic lead terminal. Finally, the capacitor elements were covered externally with an epoxy resin to complete the solid state electrolytic capacitors.

For the solid state capacitors obtained in this way, the static electricity capacity at a frequency of 120 Hz and 100 kHz, and the ESR at a frequency of 100 kHz were measured. Moreover, a current recorded 30 seconds after a voltage of 2.5 V was applied to the solid state capacitors was taken as the leakage current. The result is shown in Table 1. Table 1 shows the minimum and maximum values of the 20 sample points on the upper rows, and the average values on the lower rows, respectively.

TABLE 1

|  | 120 Hz - capacity (μF) | 100 kHz - capacity (μF) | 100 kHz - ESR (mΩ) | leakage current (μA) |
|---|---|---|---|---|
| Sample 1 | 255-290 | 226-254 | 22-31 | 190-420 |
|  | 278 | 239 | 28 | 240 |
| Sample 2 | 240-282 | 193-231 | 35-47 | 330-690 |
|  | 261 | 212 | 40 | 450 |
| Sample 3 | 248-287 | 219-244 | 25-36 | 230-480 |
|  | 264 | 230 | 30 | 300 |

As shown in Table 1, it can be seen that large capacity, low ESR and low leak current electrolytic capacitors can be obtained by polymerization in a steam atmosphere. Furthermore, it is possible to reduce the oxygen concentration (oxygen partial pressure) and reduce the oxygen degradation of the electrically conductive macromolecules to obtain low resistance electrically conductive macromolecules, and to obtain electrically conductive macromolecules whose film delamination is small, so that solid state electrolytic capacitors that suitably combine both low ESR and large capacity are obtained. Results similar to those of Working Example 2 could be obtained, and it can be seen that polymerization within steam can be suitably used over a wide range of applications.

Further preferable aspects of the present invention are described below.

1. An electronic part including an electrically conductive macromolecular film obtained by any method described in the present specification, wherein the electronic part uses an electrically conductive film that is flat.
2. The electronic part according to the first aspect, wherein the density of the surface and the rear of the electrically conductive macromolecular film is substantially the same.
3. The electronic part according to the first or the second aspect, wherein the electronic part is a solid state electrolytic capacitor that includes an anodic conductor made from valve metal, a dielectric layer formed on the surface of the anodic conductor, and a solid state electrolyte that is formed on the surface of the dielectric layer and that includes at least an electrically conductive macromolecular layer.
4. A method for manufacturing a solid state electrolytic capacitor that includes an anodic conductor made from valve metal, a dielectric layer formed on the surface of the anodic conductor, and a solid state electrolyte that is formed on the surface of the dielectric layer and that includes at least an electrically conductive macromolecular layer, wherein the anodic conductor is manufactured by a step of reacting a monomer and an oxidizing agent at 60° C. or less, and a step of polymerizing in a polymerizing vessel in a steam atmosphere at a temperature of at least 85° C.

The invention claimed is:

1. A method for manufacturing electrically conductive macromolecules by a chemical polymerization method, the method comprising:
   a polymerization process of reacting a monomer and an oxidizing agent; and
   a chemical oxidation polymerization process performed in a polymerizing vessel that contains steam atmosphere, after the polymerization process.

2. The method for manufacturing electrically conductive macromolecules according to claim 1,
   wherein the polymerization process is performed at 60° C. or lower.

3. The method for manufacturing electrically conductive macromolecules according to claim 1,
   wherein the temperature of the steam atmosphere is at least 105° C.

4. The method for manufacturing electrically conductive macromolecules according to claim 1,
   wherein steam concentration in the stream atmosphere is at least 10 vol %.

5. The method for manufacturing electrically conductive macromolecules according to claim 1,
   wherein concentration of oxygen in the steam atmosphere is lower than 21 vol %.

6. The method for manufacturing electrically conductive macromolecules according to claim 1,
   wherein the monomer is at least one selected from pyrrole, thiophene, 3,4-ethylenedioxythiophene, aniline and derivatives of these.

7. The method for manufacturing electrically conductive macromolecules according to claim 1,
   wherein the oxidizing agent is at least one selected from manganese oxide, iron (III) salts, copper (II) salts, hydrogen peroxide and persulfate salts.

8. The method for manufacturing electrically conductive macromolecules according to claim 1,
   wherein the monomer and the oxidizing agent are at least dissolved in a water soluble solvent or water.

9. The method for manufacturing electrically conductive macromolecules according to claim 1,
   wherein when observing a layer of the electrically conductive macromolecules from the side, a ratio d/L of a separation distance d of the electrically conductive macromolecular layer from a substrate, to a length L, is 0.02 or less.

10. A solid state electrolytic capacitor comprising:
    an anodic conductor made from valve metal;
    a dielectric layer formed on a surface of the anodic conductor; and
    a solid state electrolyte that is formed on a surface of the dielectric layer and that includes an electrically conductive macromolecular layer;
    wherein the electrically conductive macromolecular layer is formed by a chemical polymerization method, the method comprising:
    a polymerization process of reacting a monomer and an oxidizing agent; and
    a chemical oxidation polymerization process performed in a polymerizing vessel that contains a steam atmosphere, after the polymerization process.

11. The solid state electrolytic capacitor according to claim 10,
    wherein the anodic conductor provides a porous body containing numerous fine pores.

* * * * *